United States Patent
Katahira et al.

(10) Patent No.: US 12,203,709 B2
(45) Date of Patent: Jan. 21, 2025

(54) HEAT-TRANSFERRING DOUBLE PIPE, INNER PIPE FOR HEAT-TRANSFERRING DOUBLE PIPE, AND MANUFACTURING METHOD THEREOF

(71) Applicant: UACJ Corporation, Tokyo (JP)

(72) Inventors: Shiro Katahira, Aichi (JP); Takuro Nakamura, Aichi (JP)

(73) Assignee: UACJ Corporation, Tokyo (JP)

( * ) Notice: Subject to any disclaimer, the term of this patent is extended or adjusted under 35 U.S.C. 154(b) by 271 days.

(21) Appl. No.: 17/753,148

(22) PCT Filed: Oct. 20, 2020

(86) PCT No.: PCT/JP2020/039392
§ 371 (c)(1),
(2) Date: Feb. 22, 2022

(87) PCT Pub. No.: WO2021/079877
PCT Pub. Date: Apr. 29, 2021

(65) Prior Publication Data
US 2022/0290925 A1 Sep. 15, 2022

(30) Foreign Application Priority Data
Oct. 23, 2019 (JP) .................. 2019-192827

(51) Int. Cl.
*F28D 7/10* (2006.01)
*F28F 1/06* (2006.01)
(Continued)

(52) U.S. Cl.
CPC ............... *F28D 7/106* (2013.01); *F28F 1/06* (2013.01); *F28F 1/08* (2013.01); *F28F 1/426* (2013.01); *F28F 2210/06* (2013.01)

(58) Field of Classification Search
CPC ..... F28D 7/106; F28F 1/06; F28F 1/08; F28F 2210/06; F16L 9/18
See application file for complete search history.

(56) References Cited

U.S. PATENT DOCUMENTS

| 910,192 A | 1/1909 | Grouvelle et al. |
| 4,715,436 A | 12/1987 | Takahashi et al. |

(Continued)

FOREIGN PATENT DOCUMENTS

| CN | 1506647 A | 6/2004 |
| CN | 1772409 A | 5/2006 |

(Continued)

OTHER PUBLICATIONS

Translation of Japanese Document JP6436529B2 named Translation—JP6436529B2 (Year: 2018).*

(Continued)

*Primary Examiner* — Paul Alvare
(74) *Attorney, Agent, or Firm* — J-TEK LAW PLLC; Jeffrey D. Tekanic; Scott T. Wakeman

(57) ABSTRACT

An inner pipe (2) is designed for a heat-transferring double pipe that exchanges heat between a fluid that flows through the interior of the inner pipe and a fluid that flows between the inner pipe and an outer pipe (10) that surrounds the inner pipe. The inner pipe has a first region (21) and a second region (22), which have transverse cross-sectional shapes that differ. The first region has a plurality of first protruding parts (211) that protrude outward and form a first recess-protrusion shape in which locations of the first protruding parts are offset helically in a longitudinal direction. The second region has a plurality of second protruding parts (221) that protrude outward and form a second recess-protrusion shape, in which locations of the second protruding parts are offset helically in the longitudinal direction.

(Continued)

The number of second protruding parts is greater than the number of first protruding parts.

20 Claims, 7 Drawing Sheets

(51) Int. Cl.
*F28F 1/08* (2006.01)
*F28F 1/42* (2006.01)

(56) References Cited

U.S. PATENT DOCUMENTS

| | | | |
|---|---|---|---|
| 5,839,505 | A | 11/1998 | Ludwig et al. |
| 5,992,512 | A | 11/1999 | Tsuri et al. |
| 6,427,480 | B1 | 8/2002 | Ito et al. |
| 6,920,917 | B2 | 7/2005 | Inoue et al. |
| 7,866,378 | B2 | 1/2011 | Nakamura et al. |
| 9,091,487 | B2 | 7/2015 | Byon et al. |
| 9,551,516 | B2 | 1/2017 | Becker et al. |
| 9,669,499 | B2 | 6/2017 | Nakamura et al. |
| 9,821,364 | B2 | 11/2017 | Byon et al. |
| 10,024,587 | B2 | 7/2018 | Schaefer et al. |
| 10,982,796 | B2 | 4/2021 | Cho |
| 2002/0023448 | A1 | 2/2002 | Ito et al. |
| 2005/0051310 | A1 | 3/2005 | Inoue et al. |
| 2005/0056409 | A1 | 3/2005 | Foli |
| 2006/0096314 | A1 | 5/2006 | Nakamura et al. |
| 2006/0096744 | A1 | 5/2006 | Nakamura et al. |
| 2006/0112556 | A1 | 6/2006 | Nakamura et al. |
| 2007/0251265 | A1 | 11/2007 | Kurata et al. |
| 2007/0289725 | A1* | 12/2007 | Paquis ............... F02M 37/0052 165/150 |
| 2009/0159248 | A1* | 6/2009 | Mimitz, Sr. ........... F28F 21/086 165/177 |
| 2009/0166019 | A1* | 7/2009 | Tokizaki ................ F28F 1/422 165/181 |
| 2009/0215378 | A1 | 8/2009 | Terai et al. |
| 2010/0230082 | A1* | 9/2010 | Patel ......................... F28F 1/08 29/890.036 |
| 2011/0073208 | A1* | 3/2011 | Nakamura ................ F16L 9/18 138/114 |
| 2012/0043055 | A1 | 2/2012 | Byon et al. |
| 2013/0192804 | A1* | 8/2013 | Matsuda .................... F28D 7/10 165/154 |
| 2014/0109373 | A1 | 4/2014 | Nakamura et al. |
| 2014/0174120 | A1 | 6/2014 | Schaefer et al. |
| 2015/0013353 | A1 | 1/2015 | Becker et al. |
| 2015/0224561 | A1 | 8/2015 | Byon et al. |
| 2015/0362174 | A1* | 12/2015 | Sung ...................... F28F 13/12 122/235.12 |
| 2019/0100079 | A1 | 4/2019 | Lee et al. |
| 2019/0345937 | A1* | 11/2019 | Sato ......................... F25B 41/42 |
| 2020/0248845 | A1* | 8/2020 | Cho ......................... F25B 41/00 |
| 2021/0172684 | A1* | 6/2021 | Nakamura ............... F28D 7/14 |

FOREIGN PATENT DOCUMENTS

| | | | | |
|---|---|---|---|---|
| CN | 101063563 | A | 10/2007 | |
| CN | 102072683 | A | 5/2011 | |
| CN | 203177706 | U | 9/2013 | |
| CN | 104094068 | A | 10/2014 | |
| CN | 106895716 | A | 6/2017 | |
| DE | 60130927 | T2 | 7/2008 | |
| DE | 102015010639 | A1 * | 2/2017 | .............. F16L 9/006 |
| EP | 3239638 | A1 * | 11/2017 | .............. F28D 7/14 |
| JP | S5737690 | A | 3/1982 | |
| JP | S60256798 | A | 12/1985 | |
| JP | H1078268 | A | 3/1998 | |
| JP | 2002318015 | A | 10/2002 | |
| JP | 2004190923 | A | 7/2004 | |
| JP | 2006162241 | A | 6/2006 | |
| JP | 2007506066 | A | 3/2007 | |
| JP | 2008116096 | A | 5/2008 | |
| JP | 2012052784 | A | 3/2012 | |
| JP | 2013113525 | A | 6/2013 | |
| JP | 2013178079 | A | 9/2013 | |
| JP | 6436529 | B2 * | 12/2018 | |
| KR | 20110054278 | A | 5/2011 | |
| KR | 20120017634 | A | 2/2012 | |
| KR | 20190019602 | | 2/2019 | |
| KR | 20190019602 | A | 2/2019 | |
| WO | 2011162170 | A1 | 12/2011 | |
| WO | 2012017777 | A1 | 2/2012 | |
| WO | 2021117725 | A1 | 6/2021 | |

OTHER PUBLICATIONS

Translation of Document EP3239638A1 named Translation—EP3239638A1 (Year: 2017).*
Unpublished U.S. Appl. No. 17/757,109.
Office Action and Search Report from the Chinese Patent Office dispatched Sep. 9, 2023 in related CN application No. 202080056301.X, and translation thereof.
English translation of the International Search Report dispatched Apr. 29, 2021 for parent application No. PCT/JP2020/039392.
English translation of the Written Opinion of the International Searching Authority for parent application No. PCT/JP2020/039392.
Office Action from the Japanese Patent Office dispatched Oct. 31, 2023 in related JP application No. 2019-192827, and machine translation thereof.
Communication dispatched Jul. 20, 2023 in related European Patent Application No. 20 879 872.8, including Search Opinion, Supplementary European Search Report and examined claims 1-8.
Communication from the European Patent Office dispatched Apr. 3, 2024 in counterpart EP application No. 20 879 872.8, including examined claims 1-7.
Office Action mailed Oct. 29, 2024, in counterpart European Patent Application No. 20879872.8, including examined claims 1-7.

* cited by examiner

HEAT-TRANSFERRING DOUBLE PIPE, INNER PIPE FOR HEAT-TRANSFERRING DOUBLE PIPE, AND MANUFACTURING METHOD THEREOF

CROSS-REFERENCE

This application is the US national stage of International Patent Application No. PCT/JP2020/039392 filed on Oct. 20, 2020, which claims priority to Japanese Patent Application No. 2019-192827 filed on Oct. 23, 2019.

TECHNICAL FIELD

The present invention relates to a heat-transferring double pipe that is applicable to a heat-exchange cycle of, for example, a motor-vehicle air conditioning apparatus or the like.

BACKGROUND ART

The heat-exchange cycle (also called a refrigeration cycle) of a motor-vehicle air conditioning apparatus or the like is a system that comprises a condenser, an evaporator, a compressor, and an expansion valve and causes Freon, $CO_2$, ammonia, or some other coolant to circulate in a circulation passageway that connects these. In such a heat-exchange cycle, it has been proposed (refer to Patent Documents 1, 2) to improve heat-exchanging performance by disposing a double pipe in the circulation passageway and effecting the exchange of heat by causing a high-temperature coolant, which is discharged from the condenser, and a low-temperature coolant, which is discharged from the evaporator, to circulate, in opposition to each other, in two streams of space configured by the double pipe.

On the other hand, to address environmental problems, coolants having a lower global warming potential are being studied for use as coolants to be used in the heat-exchange cycle. There is a concern that the heat-exchanging performance of a coolant that takes such environmental problems into consideration will be lower than that of current coolants. Consequently, to curtail performance deterioration of the heat-exchange cycle overall, it is effective to proactively utilize a configuration that further improves heat-exchanging performance by incorporating the above-mentioned double pipe.

In a system that uses a compressor to compress a gas coolant discharged from the evaporator, a malfunction will adversely occur, in which the exchange of heat cannot be performed sufficiently, in a situation in which the coolant has flowed into the compressor in the state in which the coolant has not been sufficiently evaporated, i.e., in the state in which liquid is mixed with the gas. However, this malfunction can be resolved by incorporating the above-mentioned double pipe. This is because, in the above-mentioned double pipe, the coolant can be heated before it is caused to flow into the compressor, and thereby the coolant can be sufficiently evaporated. To improve heat-exchanging performance, a twisted pipe is often used (refer to Patent Documents 1-3) as the inner pipe of double pipes proposed to date.

PRIOR ART LITERATURE

Patent Documents

Patent Document 1
  Japanese Laid-open Patent Publication 2002-318015
Patent Document 2
  Japanese Laid-open Patent Publication 2006-162241
Patent Document 3
  Japanese Laid-open Patent Publication 2013-113525

SUMMARY OF THE INVENTION

In Patent Document 1, the use of a double-pipe structure in the heat-exchange cycle is disclosed and the formation of a helical-shaped groove portion on the outer-circumferential surface of an inner pipe or on the inner-circumferential surface of an outer pipe is disclosed; nevertheless, almost nothing is disclosed beyond that regarding a specific double-pipe structure. In addition, the double pipe of Patent Document 1 is premised on a configuration having a straight-shaped straight-pipe material, and usage at parts that require bending work in a motor-vehicle air conditioner or the like is not hypothesized.

Patent Document 2 is a combination of an inner pipe, in which a groove portion has been formed helically, and a smooth outer pipe; the inner diameter of the outer pipe is made larger than the outer diameter of the inner pipe. Furthermore, at a bent portion, at which the outer pipe and the inner pipe are bent, a ridge portion of the inner pipe and an inner wall of the outer pipe contact one another; the inner pipe is held by being clamped in the radial direction by the outer pipe. That is, in this structure, there is a problem in that a narrowing of the passageway in the bent portion has adversely arisen; owing to the flow of the passageway being worsened, the thermal efficiency of the passageway decreases as pressure losses increase.

Patent Document 3 discloses a configuration in which the inner pipe at the bent portion is a straight-shaped pipe stock having no recesses or protrusions, and a helical-shaped recess-protrusion portion is provided on the inner pipe outside of the bent portion. Nevertheless, in the situation in which this configuration has been used in actuality, there is a risk that the heat-exchanging performance of the bent portion will be lower than that of the straight portion because: it becomes difficult to induce a proper turbulent flow because there are no recesses or protrusions on the inner pipe at the bent portion; owing to the bending work, the inner pipe tends to be disposed in the state in which it leans toward one side in the interior of the outer pipe; and the like. Consequently, even in the situation in which a bent portion is provided, there is demand for the development of a heat-transferring double pipe that can further improve the overall heat-exchanging performance.

It is one non-limiting aspect of the present teachings to disclose techniques for improving a heat-transferring double pipe, an inner pipe for the heat-transferring double pipe, and a manufacturing method thereof in which, even if the double pipe includes a bent portion, overall heat-exchanging performance can be improved as compared to known double pipes.

In one non-limiting embodiment of the present teachings, an inner pipe is to designed be used in a heat-transferring double pipe for exchanging heat between a fluid that flows through the interior of the inner pipe, which has been disposed in the interior of an outer pipe, and a fluid that flows between the inner pipe and the outer pipe, wherein:
  the inner pipe has a first region and a second region, which have cross-sectional shapes that differ;
  the first region has a plurality of first protruding parts that protrude outward and has a first recess-protrusion shape in which locations of the first protruding parts are offset helically in a longitudinal direction; and the second region has a plurality of second protruding parts that protrude outward, in which the number of second protruding parts is greater than the number of first protruding parts, and has a second recess-protrusion shape, in which locations of the second protruding parts are offset helically in the longitudinal direction.

The above-mentioned inner pipe for a heat-transferring double pipe (hereinbelow, simply called an "inner pipe" where appropriate) has at least the first region and the second region as regions having differing numbers of protruding parts. Furthermore, the number of protruding parts (first protruding parts) provided in the first region is fewer than the number of protruding parts (second protruding parts) provided in the second region. Consequently, in the situation in which bending work is performed in the double-pipe state in which it is combined with an outer pipe, a decrease of the passageway area and an increase in pressure losses attendant with bending work tend to occur less in the first region portion, in which the number of protruding parts is small, than in the second region portion.

In addition, because the first region is provided with the plurality of protruding parts, a proper turbulent flow can be induced in the interior of the inner pipe and in the passageway(s) between the inner pipe and the outer pipe. Consequently, a decrease in heat-exchanging performance can be curtailed better when the first region portion is used than in the situation in which a smooth pipe is provided as the inner pipe. Consequently, for example, by utilizing the first region portion in at least a portion of the bent portion, a decrease of the passageway area in the bent portion can be curtailed, and a decrease in the heat-exchanging performance of the bent portion can be curtailed.

In addition, the number of protruding parts in the second region is greater than that in the first region. Consequently, for example, in a straight portion or the like, because it is unnecessary to consider deformation or the like caused by bending work, it is possible to aim for the optimal heat-exchanging performance from the standpoint of design by selecting the optimal number of protruding parts.

Thus, the above-mentioned inner pipe has recess-protrusion-shaped portions not merely of one kind but has the above-mentioned first region and the above-mentioned second region in the longitudinal direction, which are portions of at least two kinds having differing shapes. Consequently, a double pipe, in which the inner pipe having such a structure is combined with the separately prepared outer pipe, can achieve, more than in the past, an increase in bending work compatibility and partial heat-exchange performance, and, as a result, can achieve an increase in overall heat-exchanging performance by disposing the first region and the second region at desired locations in accordance with their ultimately processed shapes.

DETAILED DESCRIPTION

Figure 1:
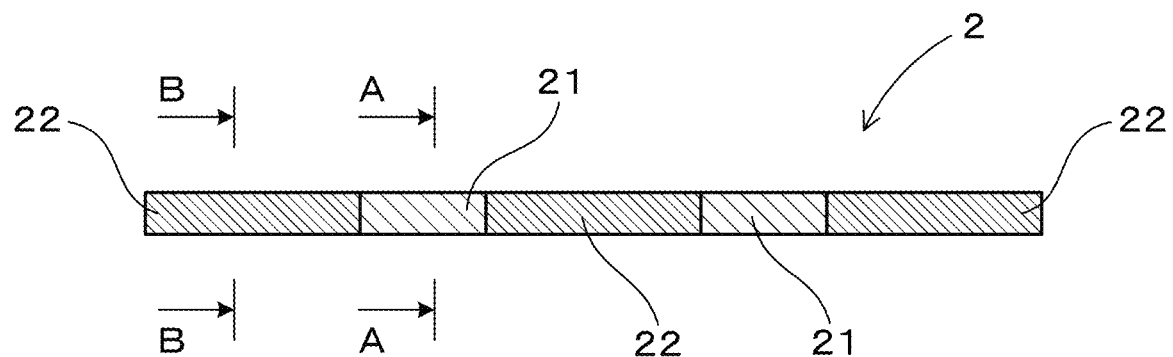
FIG. 1 is an explanatory diagram that shows the arrangement of first regions and second regions of an inner pipe for a heat-transferring double pipe according to Working Example 1.

The above-mentioned inner pipe for a heat-transferring double pipe has at least a first region and a second region, as described above. The above-mentioned first region has a plurality of first protruding parts that protrude outward. Viewed in a cross section orthogonal to the longitudinal direction, a variety of shapes, such as a triangular shape, an arcuate shape, and an inverted-U shape, can be used as the shape of the first protruding parts. In addition, with regard to the first protruding parts, those shapes in which the width dimension becomes smaller as it goes outward excel in buckling resistance, and therefore are preferable.

The locations of the first protruding parts of the above-mentioned first region are offset helically in the longitudinal direction. The offset state is preferably within the range of 10°-70°, where the offset state is expressed as the tilt angle of the peak portion of the first protruding part relative to the axial center of the inner pipe.

Like the first region, the above-mentioned second region likewise has a plurality of second protruding parts that protrude outward. Like the first protruding parts, a variety of shapes can be used as the shape of the second protruding parts, and those shapes in which the width dimension becomes smaller as it goes outward are preferable. It is noted that the shape of the second protruding parts may be the same as that of the first protruding parts but may differ.

The locations of the second protruding parts of the above-mentioned second regions are offset helically in the longitudinal direction. The preferable range and the more preferable range of the tilt angle described above in the situation in which this offset state is expressed as the tilt angle of the peak portion of the second protruding part relative to the axial center of the inner pipe are the same as those in the situation of the first protruding part. Furthermore, the helical tilt angle of the second protruding parts is preferably the same angle as that of the first protruding parts at the same orientation. In this situation, manufacturing becomes easy.

The inner pipe further may have a third region, whose cross-sectional shape is a circular smooth-pipe shape in at least a portion in the longitudinal direction thereof. For example, to connect both end portions of the inner pipe with other members, the cross-sectional shape of both end portions is preferably a circular smooth-pipe shape.

The above-mentioned inner pipe has the first region and the second region, as described above, but one or a plurality of regions may be further provided whose cross-sectional shape(s) differ(s) therefrom. For example, it is also possible to provide a fourth region having a recess-protrusion shape whose configuration differs from that of the first region and the second region. In addition, it is also possible to provide the first region and the second region continuously, and it is also possible to provide the third region, the above-described fourth region, and the like such that they are sandwiched.

The number of the above-mentioned first protruding parts of the above-mentioned first region is preferably within the range of 2-10. It is noted that, to make the number of first protruding parts smaller than the number of second protruding parts, the number of first protruding parts may be set to 8 or less, 6 or less, or 4 or less. In addition, the number of second protruding parts is preferably set to within the range of 3-12. From the viewpoint of ease of manufacturing, the number of second protruding parts may be set to 10 or less, 8 or less, or 6 or less.

In addition, the number of first protruding parts is preferably half the number of second protruding parts or less. In this situation, the feature difference between the first region and the second region can be made clearer. In particular, the number of the above-mentioned second protruding parts is preferably even, and the number of the above-mentioned first protruding parts is preferably half the number of the above-mentioned second protruding parts. In this situation, as described below, manufacturing is easy.

Next, in a heat-transferring double pipe comprising the above-mentioned inner pipe for a heat-transferring double pipe and an outer pipe, which is provided and disposed on the outside thereof, the cross-sectional shape of the above-mentioned outer pipe is preferably a circular smooth-pipe shape. Any recess-protrusion shape can also be used for the outer pipe itself as long as there is no impediment to combining it with the first region and the second region of the inner pipe. However, because an outer pipe that has a smooth-pipe shape is advantageous from the standpoint of manufacturing and because heat-exchanging performance can be controlled by the inner-pipe shape, it is not very meaningful to provide the outer pipe with a recess-protrusion shape. It is noted that, to increase structural stability, it is also possible to perform straight or helical processing in order to compress the outer pipe from the outside in the double-pipe configuration.

Furthermore, the above-mentioned double pipe is particularly useful when it comprises a portion expected to be bent, which is bent by bending work, and a straight portion, which is used without undergoing bending work and has a straight shape. In this situation, the above-mentioned first region is preferably disposed at the above-mentioned portion expected to be bent, and the above-mentioned second region is preferably disposed at the above-mentioned straight portion. Thereby, the optimal heat-exchanging performance can be exhibited by the second region in the straight portion, the features of the first region can be made use of in the bent portion, and it is possible to curtail a narrowing of the passageway area and curtail an increase in pressure losses. For these reasons, it is possible to increase overall heat-exchanging performance.

Next, as a method of manufacturing the inner pipe for a heat-transferring double pipe, there is the following method.

A method of manufacturing the above-mentioned inner pipe for a heat-transferring double pipe comprises:

preparing an inner-pipe pipe stock, in which the cross-sectional shape has a circular smooth-pipe shape;

using an inner-pipe shaping apparatus, which comprises a plurality of pressing disks disposed spaced apart in a circumferential direction and opposing an outer-circumferential surface of the inner-pipe pipe stock, wherein: the pressing disks have a disk shape and have a pressing surface on an outer circumference thereof; the pressing disks are provided in a manner to be rotatable with the movement of the inner-pipe pipe stock in the state in which the pressing surfaces are pressed against the outer-circumferential surface of the inner-pipe pipe stock; and a plane of rotation, which includes the rotational locus of the center location in the width direction of the pressing surfaces, is disposed, viewed from a direction that is parallel to the plane of rotation, in a diagonal direction that is tilted from the axial center of the inner-pipe pipe stock;

in a state in which the pressing surface of each of the pressing disks is pressed against the outer-circumferential surface of the inner-pipe pipe stock, deforming the cross-sectional shape of the inner-pipe pipe stock by causing the inner-pipe pipe stock to advance in the axial direction relative to the pressing disks and causing the above-mentioned pressing disks to rotate; and obtaining the first recess-protrusion shape and the second recess-protrusion shape by causing the pressing state of each of the pressing disks to change.

In this method, the inner-pipe shaping apparatus having the above-mentioned specific configuration is used to shape the inner-pipe pipe stock having the smooth-pipe shape. As described above, the above-mentioned inner-pipe shaping apparatus has a plurality of pressing disks and is disposed such that their rotational directions are oriented diagonal to the axis of the inner pipe so that the pressing surfaces thereof can move helically relative to the outer-circumferential surface of the inner pipe. In this configuration, by causing the pressing states of the pressing disks to change, the number and configuration of the protruding parts formed by the pressing disks can be changed. Consequently, for example, by imparting a change to the pressing states of the pressing disks in the longitudinal direction of the inner-pipe pipe stock, a plurality of regions having differing recess-protrusion shapes can be provided in the longitudinal direction. In the situation in which, for example, the change in the pressing states is to change all locations of the plurality of pressing disks to a concentric-circles state, various methods can be selected so as to perform pressing using, for example, just some of the pressing disks.

WORKING EXAMPLES

Working Example 1

Working examples of the above-mentioned heat-transferring double pipe and the above-mentioned inner pipe for the heat-transferring double pipe will now be explained, with reference to FIG. 1 to FIG. 7.

Figure 6:
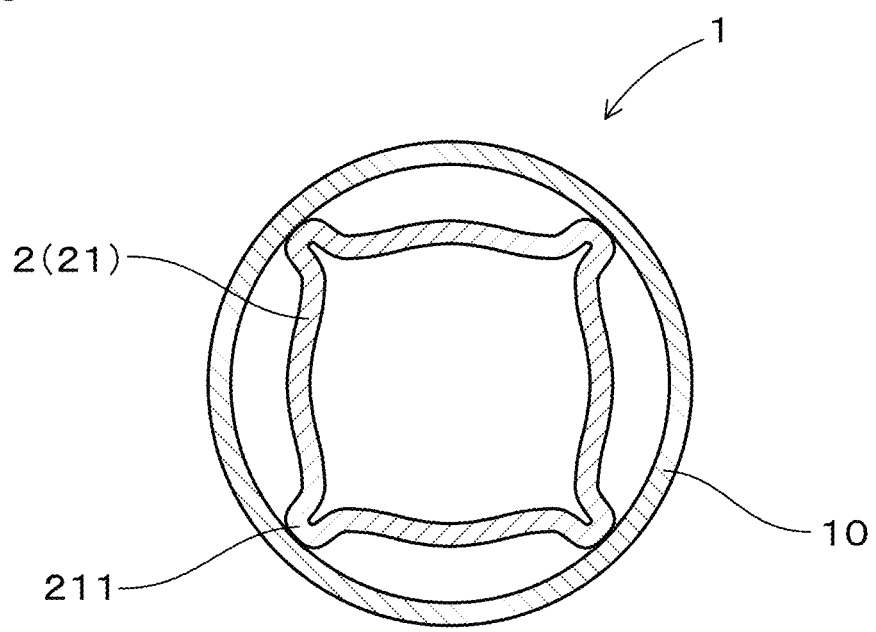
FIG. 6 is an explanatory diagram that shows the transverse, cross-sectional shape of a first region portion in a double pipe in which an inner pipe and an outer pipe are combined according to Working Example 1.
Figure 7:
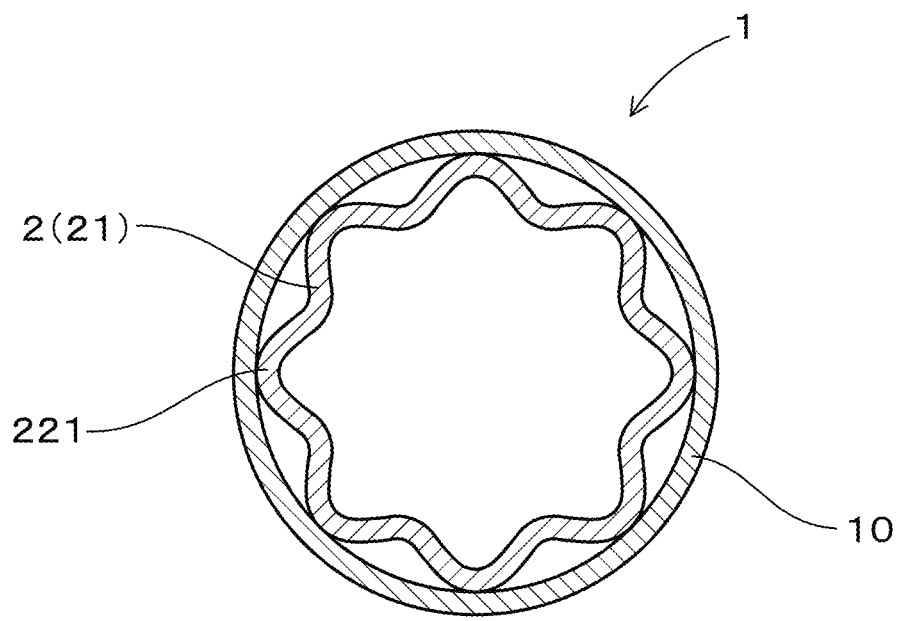
FIG. 7 is an explanatory diagram that shows the transverse, cross-sectional shape of a second region portion in the double pipe in which the inner pipe and the outer pipe are combined according to Working Example 1.

As shown in FIG. 6 and FIG. 7, an inner pipe 2 for use in a heat-transferring double pipe of the present example is an inner pipe 2 to be used in a heat-transferring double pipe 1 for exchanging heat between a fluid that flows through the interior of the inner pipe 2, which is disposed in the interior of an outer pipe 10, and a fluid that flows between the inner pipe 2 and the outer pipe 10.

Figure 2:
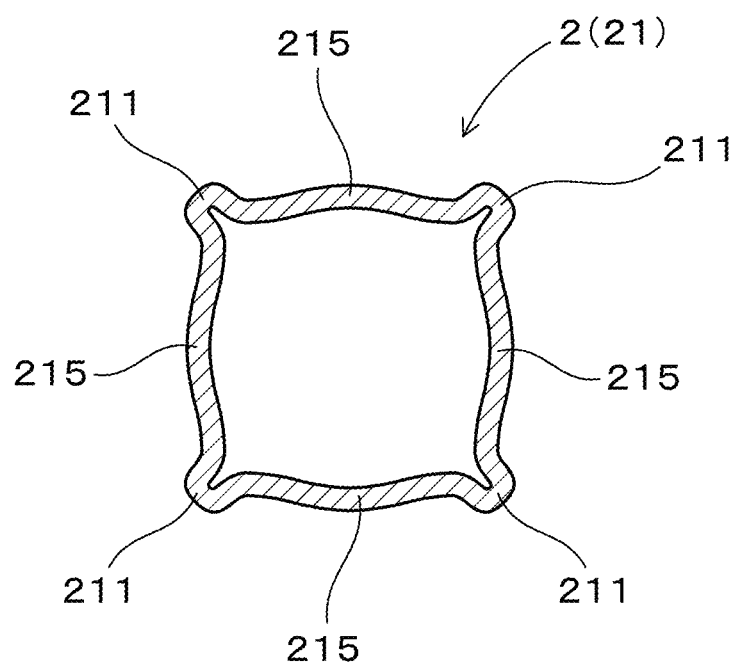
FIG. 2 is an explanatory diagram (cross section taken along line A-A in FIG. 1) that shows the transverse, cross-sectional shape of the first region according to Working Example 1.
Figure 3:
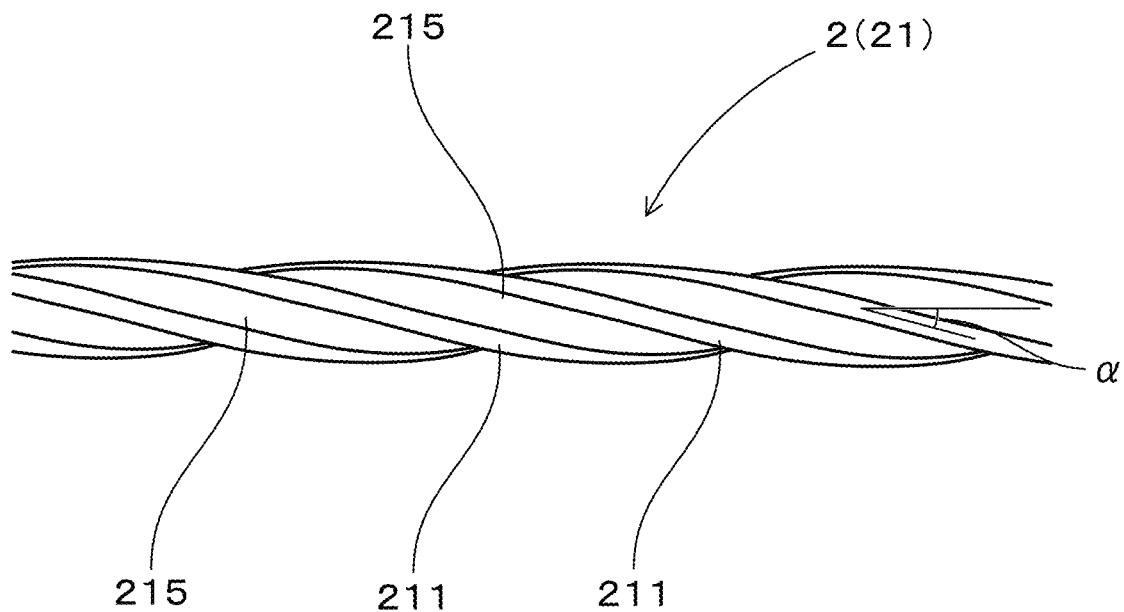
FIG. 3 is a photograph, substituting for a drawing, that shows the external appearance of the first region according to Working Example 1.
Figure 4:
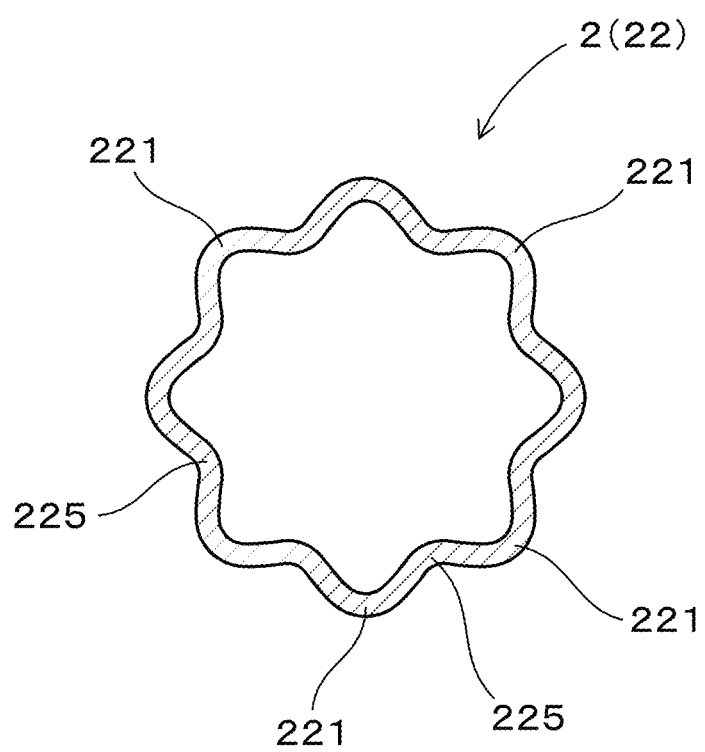
FIG. 4 is an explanatory diagram (cross section taken along line B-B in FIG. 1) that shows the transverse, cross-sectional shape of the second region according to Working Example 1.
Figure 5:
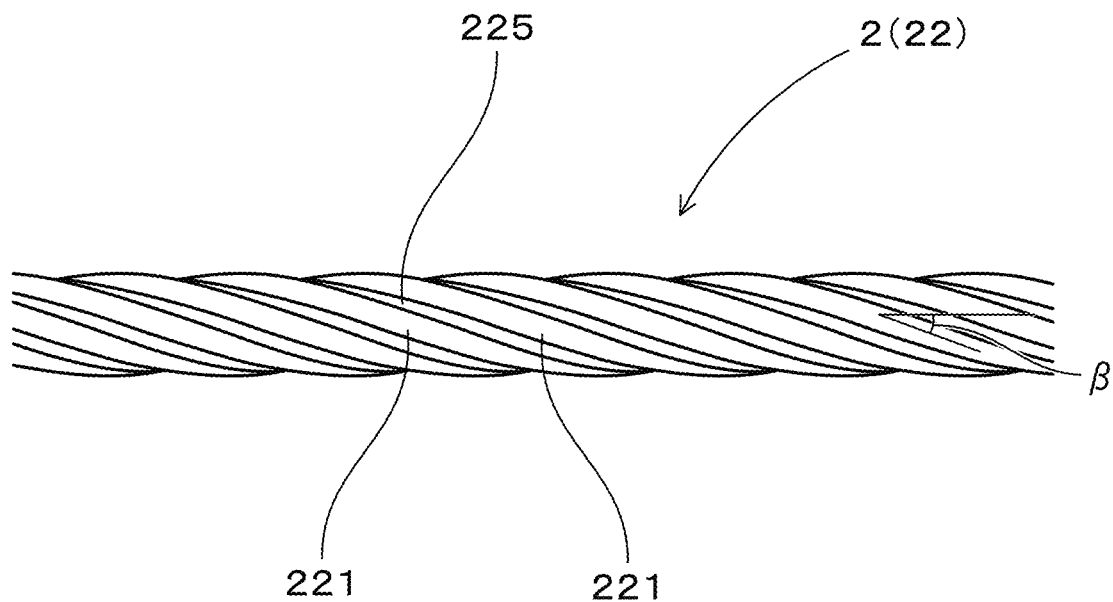
FIG. 5 is a photograph, substituting for a drawing, that shows the external appearance of the second region according to Working Example 1.

As shown in FIG. 1, the inner pipe 2 has first regions 21 and second regions 22, which have cross-sectional shapes that differ. As shown in FIG. 2 and FIG. 3, the first region 21 has a plurality of first protruding parts 211, which protrude outward, and has a first recess-protrusion shape in which the locations of the first protruding parts 211 are offset helically in the longitudinal direction. As shown in FIG. 4 and FIG. 5, the second region 22 has a plurality of second protruding parts 221, which protrude outward, and has a second recess-protrusion shape in which the number of second protruding parts 221 is greater than the number of first protruding parts 211 and the locations of the second protruding parts 221 are offset helically in the longitudinal direction. This is further explained below.

As shown in FIG. 1, the inner pipe 2 of the present example has the second regions 22 at three locations in the longitudinal direction and has the first regions 21 at two locations between the second regions 22. Furthermore, these are constituted seamlessly from a single pipe body.

As shown in FIG. 2 and FIG. 3, the first region 21 has four of the first protruding parts 211, which are disposed substantially equispaced in the circumferential direction. Each of the first protruding parts 211 has an arcuate-shaped peak portion and a comparatively narrow width. Furthermore, the spacing between the first protruding parts 211 that are adjacent to one another is set comparatively wide. Band-shaped, side-surface parts 215, which have a curved surface that gently bulges outward and are offset helically in the longitudinal direction, the same as the first protruding parts 211, are provided between the first protruding parts 211 that are adjacent one another. The offset state of each of the first protruding parts 211 is set to $\alpha=20°$, where the offset state is expressed as a tilt angle $\alpha$ of the peak portion of the first protruding part 211 relative to the axial center of the inner pipe.

As shown in FIG. 4 and FIG. 5, the second region 22 has eight of the second protruding parts 221, which are disposed substantially equispaced in the circumferential direction, and there is a valley part 225 between the second protruding parts 221 that are adjacent to one another. Each of the second protruding parts 221 has an arcuate-shaped peak portion, and each of the valley parts 225 has an arcuate shape that is depressed inward, and these are connected smoothly. The offset state of each of the second protruding parts 221 is set to $\beta=20°$, the same as the situation of the first protruding part 211, where the offset state is expressed as a tilt angle $\beta$ of the peak portion of the second protruding part 221 relative to the axial center of the inner pipe.

The outer diameter (the diameter of a circumscribed circle) of both the above-mentioned first region 21 and the above-mentioned second region 22 is in the range of 15-25 mm, but the dimension can change where appropriate in accordance with the application.

As shown in FIG. 6 and FIG. 7, the heat-transferring double pipe 1 can be constituted by covering the inner pipe 2, which has the above-mentioned configuration, with the outer pipe 10 on the outside of the inner pipe 2. In the present example, a smooth pipe whose cross-sectional shape is a circular shape is used as the outer pipe 10. It is noted that a pipe having a shape other than a smooth pipe can be used as the outer pipe 10. In addition, for example, after the outer pipe 10, which is a smooth pipe, has been mounted on the outside of the inner pipe 2, a process, which creates a groove having a straight shape or a helical shape from the outside of the outer pipe 10, can also be performed.

Because the heat-transferring double pipe 1 of the present example comprises the inner pipe 2 having the above-mentioned specific shape, the functions and effects below, which are superior to those of previously existing heat-transferring double pipes, can be obtained. That is, the inner pipe 2 has the first regions 21 and the second regions 22 as the portions having two different recess-protrusion shapes. Furthermore, each of the second regions 22 has a greater number of recessed shapes and protruding shapes, each of the second regions 22 has a larger inner surface area and outer surface area, and each of the second regions 22 is larger and has a more complex shape. Consequently, in the situation in which the double pipe is constituted in combination with the outer pipe 10, the heat-exchanging performance of the second region 22 portions is higher than that of the heat-exchanging performance of the first region 21 portions when compared with a pipe that is in a straight state. On the other hand, in the situation in which bending work has been performed in the double-pipe state, the possibility that the passageway between the outer pipe 10 and the inner pipe 2 will become narrow or pressure losses will increase is greater in the second region 22 portions, which have a complex shape, than in the first region 21 portions.

Consequently, with regard to the bent portions, which have undergone bending work, it becomes easy to better curtail a narrowing of the passageway or an increase in pressure losses when the first regions 21 are employed, and it is considered that overall heat-exchanging performance will increase. In addition, it can be easily understood that, compared with the situation in which a smooth pipe is employed as the inner pipe, heat-exchanging performance is higher in a pipe having the first regions 21, which have a recess-protrusion shape. For this reason, in the situation in which it is assumed that portions expected to be bent, which are bent by performing bending work, and straight portions, which are used without undergoing bending work and have a straight shape, are provided, the heat-transferring double pipe 1 of the present example can utilize a configuration in which the first regions 21 are disposed in the portions expected to be bent and the second regions 22 are disposed in the straight portions. Then, this situation makes best use of the advantages of the first regions 21 and the advantages of the second regions 22, and it becomes possible to obtain a heat-exchanging performance that is superior to those in the past.

Working Example 2

In the present example, a modified example of the inner pipe 2 for a heat-transferring double pipe according to Working Example 1 is described.

Figure 8:
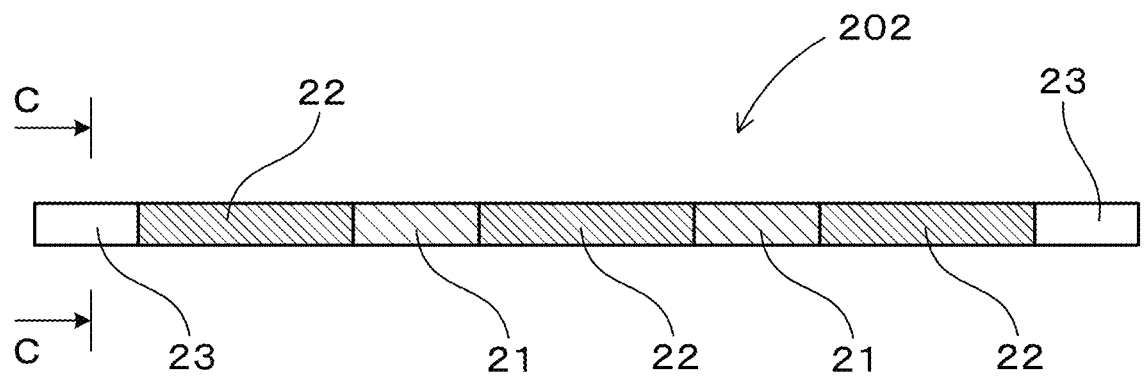
FIG. 8 is an explanatory diagram that shows the arrangement of the first regions, the second regions, and third regions of the inner pipe for a heat-transferring double pipe according to Working Example 2.
Figure 9:
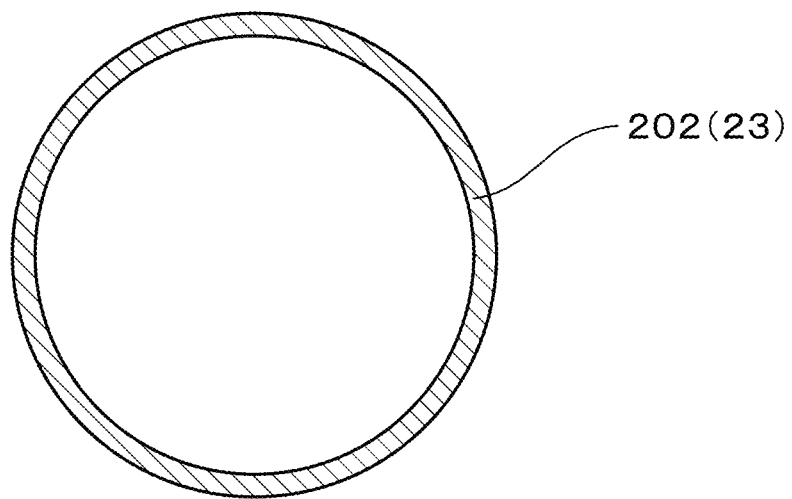
FIG. 9 is an explanatory diagram (cross section taken along line C-C in FIG. 8) that shows the transverse, cross-sectional shape of the third region according to Working Example 2.

As shown in FIG. 8 and FIG. 9, an inner pipe 202 for a heat-transferring double pipe of the present example comprises a plurality of the first regions 21 and a plurality of the second regions 22 in the longitudinal direction, and further comprises third regions 23, whose cross-sectional shape is a circular smooth-pipe shape, at both ends.

In the situation in which a double pipe is constituted using the inner pipe 202 of the present example, because the third regions 23 at both ends have a smooth-pipe shape, the third regions 23 can be easily used as seam portions that connect with other parts. Consequently, utility can be further increased. It is noted that, where appropriate, the above-mentioned third regions 23 may be interposed between, for example, the first regions 21 and the second regions 22.

Working Example 3

The present example relates to a method of manufacturing the inner pipe 2 for a heat-transferring double pipe of Working Example 1.

Figure 10:
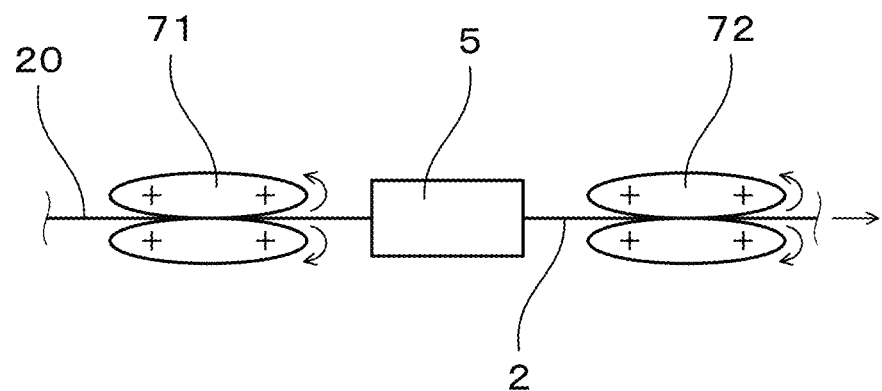
FIG. 10 is an explanatory diagram that shows a portion of a line that includes an inner-pipe shaping apparatus according to Working Example 3.
Figure 11:
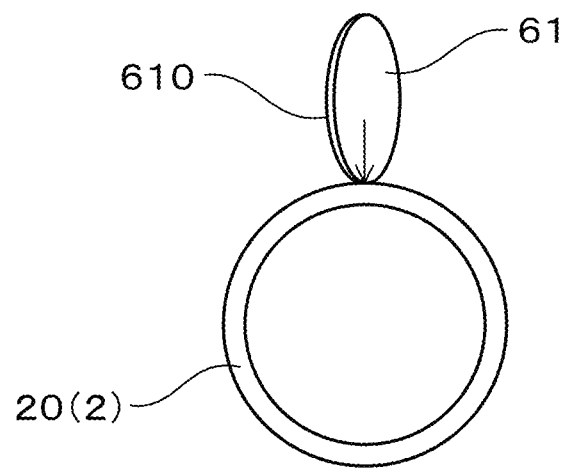
FIG. 11 is an explanatory diagram that shows, viewed from an axial direction, the arrangement of a pressing disk according to Working Example 3.
Figure 12:
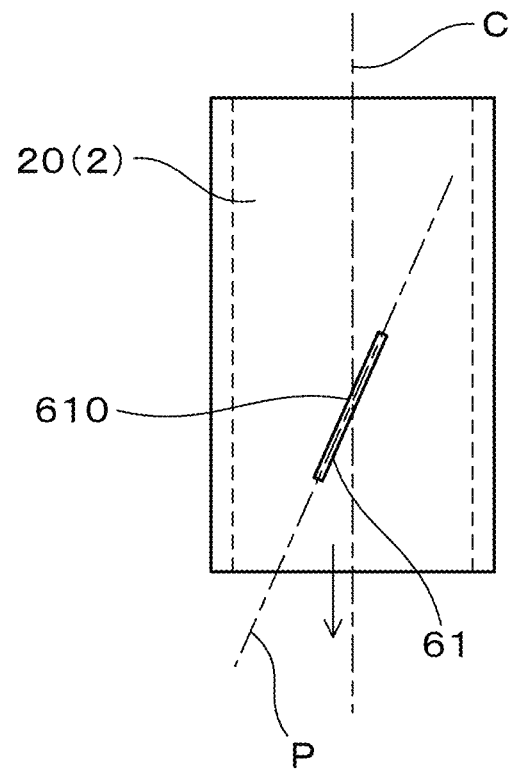
FIG. 12 is an explanatory diagram that shows, viewed from a radial direction, the arrangement of the pressing disk according to Working Example 3.

In the present example, an inner-pipe pipe stock 20, in which the cross-sectional shape has a circular smooth-pipe shape, is prepared, and the inner pipe is shaped using an inner-pipe shaping apparatus 5, which is shown in FIG. 10 to FIG. 12. As shown in FIG. 10, the inner-pipe shaping apparatus 5 is disposed approximately in the middle between input-side caterpillars 71 and output-side caterpillars 72. Furthermore, the input-side caterpillars 71 and the output-side caterpillars 72 have a function that, while applying suitable tension to the inner-pipe pipe stock 20 and to the inner pipe 2 after its shaping, causes the inner-pipe pipe stock 20, which has been inserted into the inner-pipe shaping apparatus 5, and the inner pipe 2 to move in the axial direction. It is noted that, a supply apparatus, a straightening machine, a cleaning machine, and the like for the inner-pipe pipe stock can be disposed upstream of the input-side caterpillars 71; a straightening machine, a cleaning machine, a cutting machine, and the like for the post-shaped inner pipe can be disposed on the downstream side of the output-side caterpillars 72; thereby it is possible to configure a continuous line that extends from the supply of the inner-pipe pipe stock to the collection of the inner pipe after its formation.

As shown in FIG. 12, a plane of rotation P, which includes a rotational locus of a center location in the width direction of a pressing surface 610 of a pressing disk 61, is disposed, viewed from a direction parallel to the plane of rotation P, in a diagonal direction that is tilted from an axial center C of the inner-pipe pipe stock 20.

In the state in which the pressing surfaces 610 of each of the pressing disks 61 are pressed against the outer-circumferential surface of the inner-pipe pipe stock 20, the input-side caterpillars 71 and the output-side caterpillars 72 are driven using the inner-pipe shaping apparatus 5 having the above-mentioned configuration, thereby causing the inner-pipe pipe stock 20 to advance in the axial direction relative to the pressing disks 61. Thereby, the cross-sectional shape of the inner-pipe pipe stock 20 is caused to deform. Furthermore, the first recess-protrusion shape and the second recess-protrusion shape can be obtained by changing the pressing state of each of the pressing disks 61.

With regard to the second recess-protrusion shape of the second regions 22 in Working Example 1, a second recess-protrusion shape having eight of the second protruding parts 221 can be formed, as shown in FIG. 4, by using eight of the pressing disks 61 to equally and properly press the inner-pipe pipe stock 20. In addition, with regard to the first recess-protrusion shape of the first regions 21 in Working Example 1, a first recess-protrusion shape, in which only four protruding parts (first protruding parts 211) protrude independently, as shown in FIG. 2, is obtained by further increasing (deepening) the amount of pressing of the eight pressing disks 61.

Figure 13:
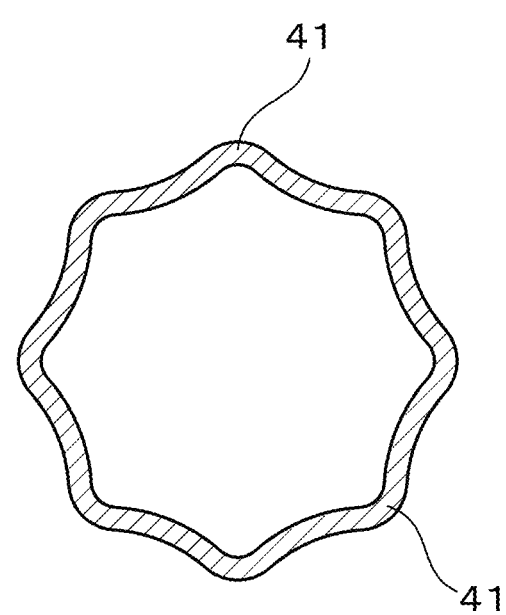
FIG. 13 is an explanatory diagram that shows another example of a recess-protrusion shape of the inner pipe.
Figure 14:
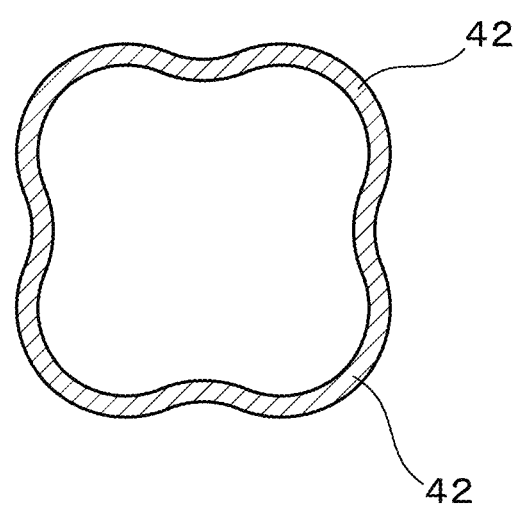
FIG. 14 is an explanatory diagram that shows yet another example of the recess-protrusion shape of the inner pipe.

It is noted that, in the situation in which the amount of pressing of the eight pressing disks 61 is made smaller than in the situation in which the second regions 22 are formed, a recess-protrusion shape having eight protruding parts 41, which are low and whose shapes differ somewhat from that of the second protruding parts 221, is formed as shown in FIG. 13. In addition, in the situation in which, of the eight pressing disks 61, four of the pressing disks 61 are retracted to locations at which they do not make contact with the inner-pipe pipe stock 20 and only the remaining four pressing disks 61 press the inner-pipe pipe stock 20 lightly, a recess-protrusion shape having four gentle curved-surface-shaped protruding parts 42 is formed as shown in FIG. 14.

In the above-mentioned shaping apparatus 5, eight of the pressing disks 61 are provided, but of course it is also possible to change the number thereof; in addition, by controlling the amount of pressing of each of the pressing disks, a variety of recess-protrusion shapes can be formed. Furthermore, by changing the shaping conditions in the longitudinal direction of the inner pipe, recess-protrusion shapes having differing cross-sectional shapes can be formed lined up in the longitudinal direction, and thereby an inner pipe for a heat-transferring double pipe having desired characteristics can be easily obtained.

The invention claimed is:

1. A heat-transferring double pipe for exchanging heat between a first fluid that flows through the interior of an inner pipe, which has been disposed in the interior of an outer pipe such that the outer pipe surrounds the inner pipe, and a second fluid that flows between the inner pipe and the outer pipe,
    wherein:
    the inner pipe has a first region and a second region respectively defined in different longitudinal portions of the inner pipe along a longitudinal direction of the inner pipe, which have cross-sectional shapes that differ;
    the first region has a plurality of first protruding parts that protrude outward and form a first recess-protrusion shape in which locations of the first protruding parts are offset helically in a longitudinal direction of the inner pipe;
    the second region has a plurality of second protruding parts that protrude outward and form a second recess-protrusion shape, in which locations of the second protruding parts are offset helically
    in the longitudinal direction;
    the number of second protruding parts is greater than the number of first protruding parts;
    the heat-transferring double pipe comprises a first portion that is bent, and a second portion having a straight shape;
    the first portion at least partially spans the first region; and
    the second portion spans the second region.

2. The heat-transferring double pipe according to claim 1, wherein the inner pipe further has a third region having a cross-sectional shape that is a circular smooth-pipe shape along at least a portion of the inner pipe in the longitudinal direction thereof.

3. The heat-transferring double pipe according to claim 1, wherein the number of first protruding parts is 2-10.

4. The heat-transferring double pipe according to claim 1, wherein the number of first protruding parts is half the number of second protruding parts or less.

5. The heat-transferring double pipe according to claim 1, wherein the cross-sectional shape of the outer pipe is a circular smooth-pipe shape.

6. A method of manufacturing the heat-transferring double pipe according to claim 1, comprising:
    providing an inner-pipe pipe stock having a circular cross-sectional shape;

providing an inner-pipe shaping apparatus, which comprises a plurality of pressing disks disposed spaced apart in a circumferential direction and opposing an outer-circumferential surface of the inner-pipe pipe stock, wherein: the pressing disks each have a disk shape and a pressing surface on an outer circumference of the pressing disk; the pressing disks are rotatable while the inner-pipe pipe stock is moving in an axial direction in a state in which at least one of the pressing surfaces is pressed against the outer-circumferential surface of the inner-pipe pipe stock; and a plane of rotation, which includes the rotational locus of the center location in the width direction of the pressing surfaces, is disposed, viewed from a direction that is parallel to the plane of rotation, in a diagonal direction that is tilted from an axial center line of the inner-pipe pipe stock;

in a state in which the pressing surface of the at least one of the pressing disks is pressed against the outer-circumferential surface of the inner-pipe pipe stock, advancing the inner-pipe pipe stock in the axial direction relative to the pressing disks while causing the at least one of the pressing disks to deform the cross-sectional shape of the inner-pipe pipe stock to form the first recess-protrusion shape; and thereafter, changing an amount of pressing of the at least one of the pressing disks against the outer-circumferential surface of the inner-pipe pipe stock to form the second recess-protrusion shape while continuing to advance the inner-pipe pipe stock in the axial direction relative to the pressing disks.

7. The heat-transferring double pipe according to claim 2, wherein the number of first protruding parts is 2-10.

8. The heat-transferring double pipe according to claim 7, wherein the number of first protruding parts is half the number of second protruding parts or less.

9. The heat-transferring double pipe according to claim 8, wherein the outer pipe has a circular smooth-pipe shape in transverse cross-section.

10. A heat-transferring double pipe for use in exchanging heat between a first fluid that flows through the interior of an inner pipe and a second fluid that flows between the inner pipe and an outer pipe that surrounds the inner pipe, wherein:

the inner pipe has a first region and a second region respectively defined along separate sections extending in a longitudinal direction of the inner pipe in parallel to an axial center line of the inner pipe, the first region has a first transverse cross-sectional shape that differs from a second transverse cross-sectional shape of the second region;

the first region has a first number of first protrusions that protrude radially outward and extend helically relative to the axial center line of the inner pipe and in parallel to each other;

the second region has a second number of second protrusions that protrude radially outward and extend helically relative to the axial center line of the inner pipe and in parallel to each other;

the second number is greater than the first number;

the inner pipe and outer pipe are curved in a first segment that is within the first region of the inner pipe, and the inner pipe and outer pipe are straight along a second segment that spans the second region of the inner pipe.

11. The heat-transferring double pipe according to claim 10, wherein:

the first number is between 2-10; and the first number is half or less of the second number.

12. The heat-transferring double pipe according to claim 11, wherein the first and second protrusions each extend at a tilt angle of 10°-70° relative to the axial center line of the inner pipe.

13. The heat-transferring double pipe according to claim 12, wherein the first and second protrusions have the same tilt angle relative to the axial center line of the inner pipe.

14. The heat-transferring double pipe according to claim 13, wherein the first and second protrusions contact the outer pipe along one or more longitudinal portions of the heat-transferring double pipe.

15. The heat-transferring double pipe according to claim 10, wherein the first number is between 2-10.

16. The heat-transferring double pipe according to claim 10, wherein the first number is half or less of the second number.

17. The heat-transferring double pipe according to claim 10, wherein the first and second protrusions each extend at a tilt angle of 10°-70° relative to the axial center line of the inner pipe.

18. The heat-transferring double pipe according to claim 10, wherein the first and second protrusions have the same tilt angle relative to the axial center line of the inner pipe.

19. The heat-transferring double pipe according to claim 10, wherein the first and second protrusions contact the outer pipe along one or more longitudinal portions of the heat-transferring double pipe.

20. The heat-transferring double pipe according to claim 10, wherein the outer pipe has a circular smooth-pipe shape in transverse cross-section at least along the second segment.

* * * * *